US009733794B1

(12) United States Patent
Hughes et al.

(10) Patent No.: US 9,733,794 B1
(45) Date of Patent: Aug. 15, 2017

(54) SYSTEM AND METHOD FOR SHARING DIGITAL MEDIA ITEM WITH SPECIFIED START TIME

(75) Inventors: Taylor Eric Hughes, San Francisco, CA (US); Jennifer Bilotta, San Francisco, CA (US); Brian Glick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 697 days.

(21) Appl. No.: 13/424,679

(22) Filed: Mar. 20, 2012

(51) Int. Cl.
*G06F 3/048* (2013.01)
*G06F 3/0482* (2013.01)
*H04L 29/08* (2006.01)
*G06F 3/0484* (2013.01)
*H04L 29/06* (2006.01)
*G11B 27/34* (2006.01)

(52) U.S. Cl.
CPC ............ *G06F 3/0482* (2013.01); *G06F 3/048* (2013.01); *G06F 3/04842* (2013.01); *G11B 27/34* (2013.01); *H04L 67/02* (2013.01); *H04L 67/10* (2013.01); *H04L 67/22* (2013.01); *H04L 67/42* (2013.01)

(58) Field of Classification Search
CPC ......... G11B 27/10; G11B 27/00; G11B 27/34; G06Q 50/34; G06F 17/30044; G06F 3/0482; G06F 3/04842; G06F 3/048; H04N 21/8586; H04L 65/60
USPC ........................................................ 715/719
See application file for complete search history.

(56) References Cited

U.S. PATENT DOCUMENTS

| | | | |
|---|---|---|---|
| 2005/0210145 A1* | 9/2005 | Kim et al. ..................... 709/231 |
| 2008/0162670 A1* | 7/2008 | Chapweske et al. ......... 709/219 |
| 2008/0313541 A1* | 12/2008 | Shafton et al. ............... 715/725 |
| 2009/0013252 A1 | 1/2009 | DeWitt |
| 2009/0064005 A1 | 3/2009 | Cunningham et al. |
| 2010/0153848 A1* | 6/2010 | Saha ................. G06F 17/30884 715/721 |
| 2010/0251120 A1* | 9/2010 | Chelba ............... H04N 5/44591 715/719 |
| 2012/0047437 A1* | 2/2012 | Chan ..................... G06F 3/0482 715/720 |
| 2012/0094768 A1 | 4/2012 | McCaddon et al. |
| 2012/0315014 A1* | 12/2012 | Shuster ......................... 386/241 |
| 2013/0129308 A1 | 5/2013 | Kam et al. |

OTHER PUBLICATIONS

ChopShop, http://www.journalofaccountancy.com/Issues/2011/Nov/TubeChop.htm, Nov. 2011, 2 pages.*

(Continued)

*Primary Examiner* — Jaime Duckworth
(74) *Attorney, Agent, or Firm* — Lowenstein Sandler LLP (57) ABSTRACT

A computing device that provides access to digital media items receives a command from an entity to share a digital media item. The computing device invokes a graphical user interface for sharing the digital media item in response to receiving the command. The computing device determines a start time to apply to the digital media item based on input received via the graphical user interface. The computing device then generates a link or embed code to the digital media item, the link or embed code identifying the start time, wherein accessing the link or embed code causes the digital media item to be presented from the start time.

17 Claims, 7 Drawing Sheets

(56) References Cited

OTHER PUBLICATIONS

NerdCrunch, http://nerdcrunch.com/2011/05/28/how-to-expand-url/, May 28, 2011, 4 pages.*

U.S. Appl. No. 61/509,087, filed Jul. 2011, Shuster, Brian.*

Wiebe, Glenn. "TubeChop is easy and cool," History Tech, Jan. 13, 2011, 6 pages, <http://historytech.wordpress.com/2011/01/13/tubechop-is-easy-and-cool/.

YouTube, How to embed a YouTube video, YouTube Help, Mar. 22, 2012, available http://support.google.com/youtube/bin/answer.py?hl=en&answer=171780.

YouTube, Sharing videos, YouTube Help, Jun. 2, 2011, available http://support.google.com/youtube/bin/answer.py?hl=en&answer=57741.

"Samuel, 2 Ways to Email iPhone Videos/Photos, Nov. 21, 2011, Wondershare Blog located inhttp://blog.wondershare.com/2-ways-to-email-iphone-videos-photos/, p. 1".

Rik Nyslewski, YouTube adds video editor for noobs, Jun. 16, 2010, The Register, pp. 1-2.

\* cited by examiner

SYSTEM AND METHOD FOR SHARING DIGITAL MEDIA ITEM WITH SPECIFIED START TIME

TECHNICAL FIELD

Embodiments of the present disclosure relate to the sharing of digital media items and, more particularly, to an interface for sharing digital media items from specified start times.

BACKGROUND

Many video and image hosting websites allow users to share images or videos with others. For example, users may share images or videos by posting links to those images or videos on social networking websites, on blogs, in emails, and so on. However, sometimes a user only wants to share a particular portion of a video or image, such as a clip that the user finds particularly engaging or funny. Unfortunately though, the sharing mechanisms provided by common video and image hosting websites typically do not provide a capability to share specified portions of images or videos that have been uploaded by others.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an embodiment of the present disclosure, a computing device that provides access to digital media items receives a command from an entity to share a digital media item. The computing device invokes a graphical user interface for sharing the digital media item in response to receiving the command. In one embodiment, the digital media item is a video and the graphical user interface is for a video player. In response to entity interaction with the graphical user interface, the computing device automatically selects a start time to apply to the digital media item based on a current play time of the digital media item. The computing device then generates a link or embed code to the digital media item, the link or embed code identifying the start time, wherein accessing the link or embed code causes the digital media item to be presented from the start time. The computing device may then post the link or embed code to a specified location.

In addition, methods and systems for performing the operations of the above described embodiments are also implemented. Further, a computer readable storage media is provided to store instructions for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

A system and method for sharing digital media items from specified start times are discussed herein. As used herein, a digital media item is an electronic representation of a video or an audio clip. Examples of digital media items include digital music and other audio files (e.g., moving picture experts group (MPEG) audio layer 3 (MP3) files, advanced audio coding (AAC) files, waveform audio file format (WAV) files, audio interchange file format (AIFF) files, Apple Lossless (m4A) files, etc.) and digital videos (e.g., MPEG-2 files, MPEG-4 (MP4) files, DivX files, audio video interlace (AVI) files, advanced video coding (AVC) files, VP8 files, etc.). An entity may be a user, a business entity, a web bot (a software application that runs an automated task over the Internet), or any other program, individual or organization.

In one embodiment, a user (or other entity) selects a video (or other digital media item), and issues a command to share the video. In response to receiving the sharing command, a video hosting website (or other digital media host) or media player invokes a user interface for sharing the video. The media player may then automatically select a start time from which to share the video based on a current play time of the video. The user may provide the current play time via the user interface, for example, by playing the video, by typing in a start time in a text box, or by dragging a playback slider. The video may be shared by posting a link to the video, where the link includes data identifying the start time. The video may also be shared by posting embed code that is directed to the video, where the embed code includes data for identifying the start time. The link or embed code may be posted to social networking websites, to blogs, to email messages, and so forth. When a user clicks on the link (or embed code), the user will be presented with the selected video from the specified start time.

Note that some embodiments of the present disclosure are described with reference to videos. However, embodiments of the present disclosure also apply to audio clips (e.g., songs, albums, user generated audio files, etc.). For example, embodiments of the present disclosure may share a selected audio clip from a specified start time.

Figure 1:
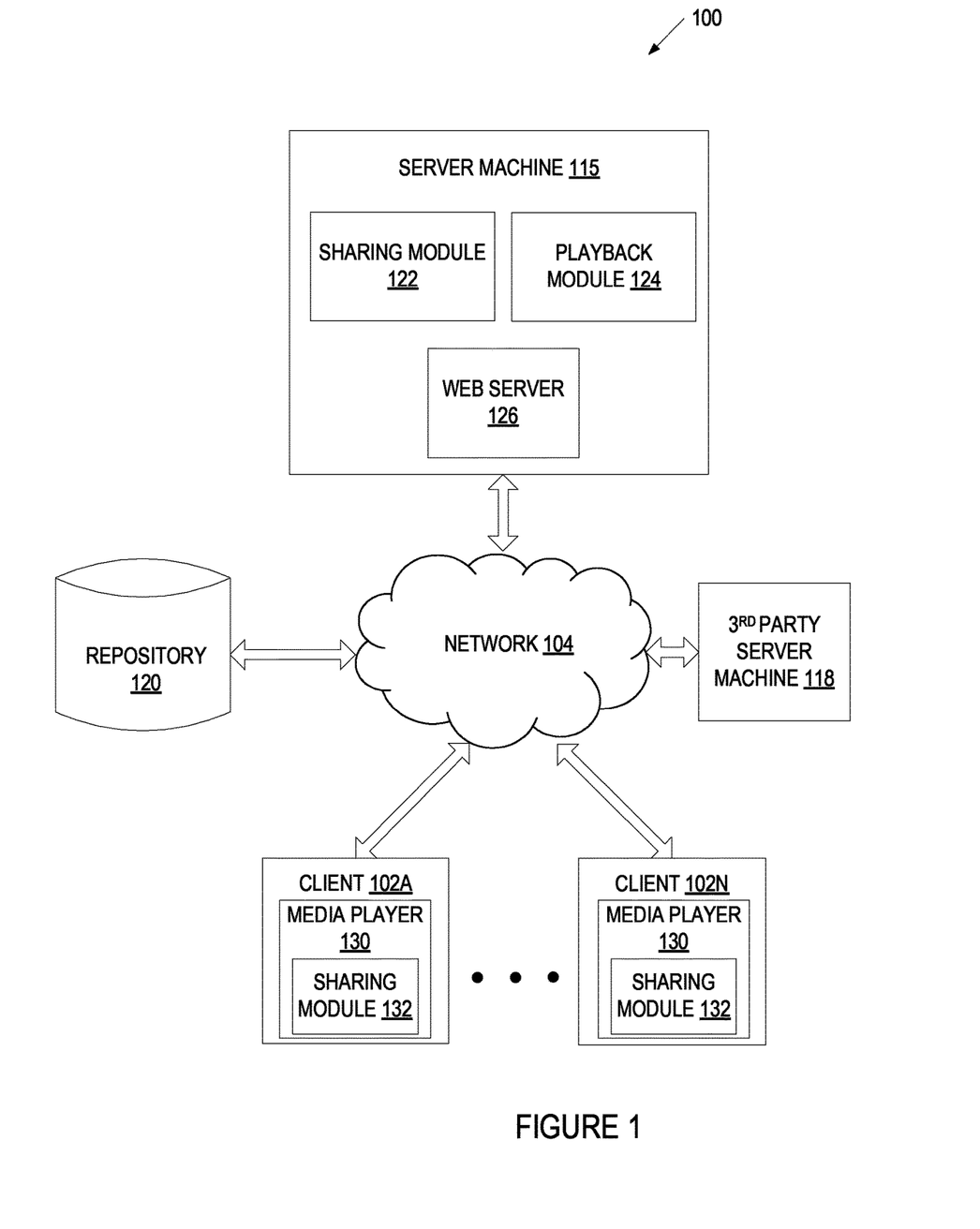
FIG. 1 illustrates an exemplary system architecture, in accordance with one embodiment of the present disclosure.

FIG. 1 illustrates an example system architecture 100, in accordance with one embodiment of the present disclosure. The system architecture 100 includes a server machine 115, a repository 120, a third party server machine 118 and client machines 102A-102N connected to a network 104. Network 104 may be a public network (e.g., the Internet), a private network (e.g., a local area network (LAN) or wide area network (WAN)), a cellular network or broadcast network, or a combination thereof.

The client machines 102A-102N may be personal computers (PCs), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue queries and commands to the web server, such as commands to access a specific digital media item, commands to share the digital media item, commands to select a start time for the digital media item, and so forth. The client machines 102A-102N may also upload digital media items to the web server for storage.

In one embodiment, client machines 102A-102N include a media player 130 that is configured to play digital media items. Media player 130 may be a video player and/or an audio player. Media player 130 may be a standalone application, may be a plugin to another application (e.g., to a web browser), or may be executable code such as JavaScript that is executed by, for example, a web browser. In one embodiment, media player 130 is a Flash player or a hypertext markup language 5 (HTML5) player. In one embodiment, media player 130 includes a sharing module 132.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 126, a sharing module 122 and a playback module 124. In alternative embodiments, the web server 126, sharing module 122 and/or playback module 124 may run on different machines. Additionally, in some embodiments, the web server 126, sharing module 122 and/or playback module 124 may be combined into a single module.

Repository 120 is a persistent storage that is capable of storing audio files and/or video files. As will be appreciated by those skilled in the art, in some embodiments repository 120 might be a network-attached file server, while in other embodiments repository 120 might be some other type of persistent storage such as an object-oriented database, a relational database, and so forth, that may be hosted by the server machine 115 or one or more different machines coupled to the server machine 115 via the network 104. The video and/or audio stored in the repository 120 may include user generated content that is uploaded by clients 102A-102N. The video and/or audio may additionally or alternatively include content provided by other entities, e.g., service providers such as news organizations, publishers, libraries and so on. In embodiments of the disclosure, the server machine 115 notifies end users of the types of information that are stored by the repository 120, and provides the end user the opportunity to opt-out of having such information assembled, analyzed, and/or shared.

Web server 140 may receive digital media items from clients 102A-102N, and store those digital media items in repository 120. Web server 140 may additionally serve digital media items (e.g., video and/or audio) from repository 120 to clients 102A-102N. Web server 140 may receive search queries and perform searches on the digital media items in the repository 120 to determine digital media items that satisfy the search query. Web server 140 may then send to a client 102A-102N those digital media items that match the search query. Clients 102A-102N may also obtain information on digital media items that are contained in the repository 120, such as by navigating a web page that provides digital media items and/or selecting one or more filters provided by the web server 126. Web server 126 may coordinate with playback module 124 to stream digital media items to clients 102A-102N, or may download the digital media items to the clients 102A-102N. In streaming, the clients 102A-102N can begin playback of video or audio files before receiving the entire audio or video (e.g., using media player 130). When the audio or video is downloaded, the audio or video typically is not playable until a complete file is received by the client 102A-102N.

Playback module 124 sends, streams or otherwise provides digital media items to requesting entities. An entity may interact with web server 126 (e.g., via a web browser running on a client 102A-102N) to browse or search for a digital media item stored in repository 120. Playback module 124 may download JavaScript or other code to a client 102A-102N operated by the entity for media player 130. Playback module 124 may stream or download the selected digital media item to the client 102A-102N, and media player 130 executing on the client may play the digital media item. The entity may decide to share the digital media item that is currently being played by media player 130. Media player 130 may provide a share button, a drop down menu with a share option, or other mechanism for sharing played digital media items. Alternatively, or in addition, a web page served by web server 126 may include buttons, dropdown menus, etc. with sharing options. An entity may initiate a sharing operation based on clicking on or otherwise selecting a sharing operation, which may cause sharing module 122 and/or sharing module 132 to be invoked.

Sharing modules 122, 132 may share digital media items. Sharing module 122 and sharing module 132 may perform the same or similar operations, but may be located on different machines. Sharing operations will be discussed with reference to sharing module 122 for clarity. However, it should be understood that sharing module 132 may also perform the same or similar operations in certain embodiments.

In one embodiment, sharing module 122 generates a link to the digital media item. The link (also known as a hyperlink) is a reference to data that an application (e.g., a web browser) can directly follow to access the data. The link, when selected or accessed, may cause a web browser or other application to load a web page provided by web server 126. Web server 126 may then cause media player 130 to be expanded into the web page.

The entity may then post (or cause the sharing module to post) a link to the digital media item to a social networking website, blog, forum, or other web site, or may email the link to another entity. Accordingly, sharing module 122 may establish a connection to third party server machine 118 that hosts a specified third party website, and post a link to the digital media item onto a web page served by third party server machine 118. Alternatively, a client 102A-102N may copy a link provided by sharing module 122, and paste that link to a website of third party server machine 118. The third party server machine 118 may host a web site such as a blog, an ecommerce website, a social networking website, or other type of website. If the third party server machine 118 hosts a social networking website, for example, sharing module 122 or clients 102A-102N may post a link to the digital media item on a particular profile or homepage of a user on the social networking website.

In one embodiment, sharing module 122 may generate embed code for the digital media item in addition to or instead of generating a link. The embed code may then be posted to locations in the manner described above with reference to links. Embed code is code such as HTML code that may cause media player 130 to be expanded into a web page provided by third part server machine 118 when an entity accesses or selects the code. Embed code, when selected or accessed, may not cause a web browser or other application to load a web page provided by web server 126. Instead, a web server of third party server machine 118 may contact web server 126 and request that a digital media item be streamed or downloaded to a client 102A-102N.

Frequently, an entity such as a user or organization is only interested in sharing a portion of a digital media item (e.g., highlights of a video). Accordingly, sharing module 122 may provide an interface (e.g., a graphical user interface (GUI)) that enables users to easily select a start time from which to begin sharing a digital media item. Sharing module 122 may present an interface for sharing a digital media item in response to receiving a sharing command. In one embodiment, sharing module 122 downloads JavaScript or other code to a client 102A-102N for the interface, and causes the client 102A-102N to execute the code. In one embodiment, sharing module 132 presents the interface within media player 130. An entity may interact with the interface running on the client, and the interface may send instructions to sharing module 122 based on the interaction. For example, a user may select a start time via the interface, and the start time may be communicated to sharing module 122. In one embodiment, sharing module 122 automatically selects a start time for the digital media item based on a current play time of the digital media item. The current play time may be adjusted by a user based on playing the digital media item, by dragging a slider that represents a current play time of the digital media item, by typing a current play time into a text box, and so forth.

In response to receiving or selecting a specified start time, sharing module 122 may generate a link to the digital media item, the link including the specified start time. In an alternative embodiment, sharing module 122 may generate embed code to the digital media item that specifies the start time. In response to an entity selecting the link or embed code (e.g., clicking on the link or embed code), playback module 124 may send the digital media item to a client associated with the entity, and may cause media player 130 to play the digital media item from the specified start time. In one embodiment, playback module 124 does not initially send a portion of the digital media item corresponding to a play time before the specified start time to the client 102A-102N.

An entity may select or otherwise interact with a link to a digital media item or embed code associated with a digital media item. In response, playback module 124 may locate the digital media item in repository 120, and stream or download the digital media item to a requesting client 102A-102N (or to a third party website that provides the digital media item to the requesting client). If the link or embed code included a specified start time, playback module 124 may play the digital media item from the specified start time.

Figure 2:
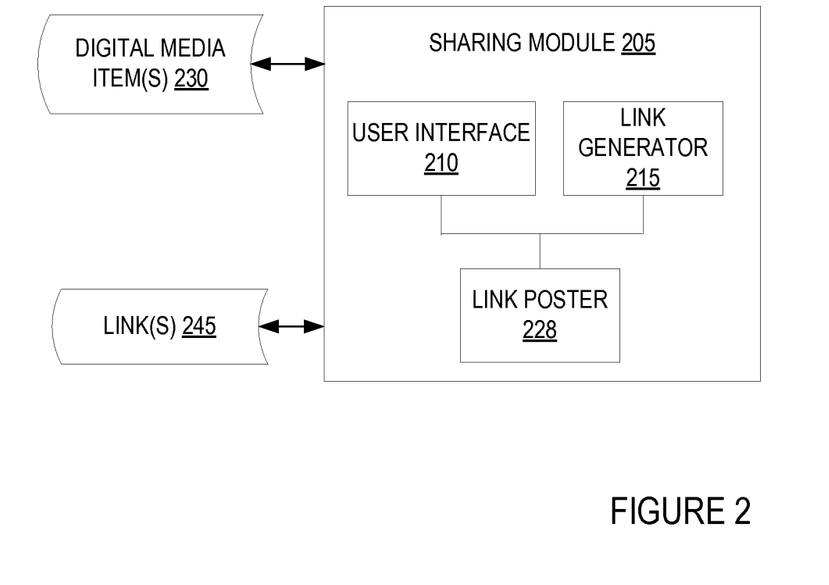
FIG. 2 is a block diagram of a sharing module, in accordance with one embodiment of the present disclosure.

FIG. 2 is a block diagram of a sharing module 205, in accordance with one embodiment of the present disclosure. The sharing module 205 may include a user interface 210 and a link generator 215. Note that in alternative embodiments, the functionality of one or more of the user interface 210 and link generator 215 may be combined into a single module or divided into multiple modules. In one embodiment, sharing module 205 corresponds to sharing module 122 and/or sharing module 132 of FIG. 1.

Sharing module 205 is invoked in response to an entity requesting to share a digital media item. The request may be received in response to the entity selecting a share option while the entity views and/or listens to a digital media item. The selected digital media item may be a digital media item 230 that was previously uploaded by another entity than the entity requesting to share that digital media item. Once invoked, sharing module 205 presents user interface 210 to the requesting entity. In one embodiment, sharing module 205 downloads JavaScript or other code for the user interface 210 to a client, and causes the client to execute the code. In another embodiment, sharing module 205 is itself JavaScript or other code that has been downloaded to a client machine. Alternatively, the interface 210 may run on a server machine. The user interface 210 may present the digital media item 230 to be shared along with inputs for one or more operations. The operations may include start time selection operations, link generation operations, embed code generation operations, etc. A user or other entity may provide commands to the user interface. The user interface may then show an updated digital media item, link and/or embed code based on the commands.

Link generator 215 may generate a link to a digital media item. The link, when selected or accessed, may cause a web browser or other application to load a web page provided by a web server that hosts the digital media item associated with the link. The link may be a long form link that specifies a full address for the digital media item. An example of such a long form link is http://www.yourvideo.com/watch?v=flowers. Alternatively, the link may be a short form link that includes an alias that can be interpreted by a universal resource locator (URL) shortening service to determine a full URL associated with the link. An example of a short form link to a digital media item is http://yvid.eo/flowers.

Link generator 215 may also generate embed code to the digital media item. The embed code may include hypertext markup language (HTML) code that may cause a media player to be expanded into a web page of a web server. The media player may be, for example, a Flash player or a hypertext markup language 5 (HTML5) player. An example of an embed code is as follows:

<iframe width="420" height="315"
src="http://www.yourvideo.com/embed/flowers"
frameborders="0" allowfullscreen></iframe>

Once link generator 215 generates a link (or embed code), link poster 228 may post the link (or embed code) to one or more locations specified by the requesting entity. For example, link poster 228 may post the link (or embed code) to specified social network websites, to specified blogs, to specified forums, etc. Link poster 228 may also email the link (or embed code) to specified email addresses.

Figure 3:
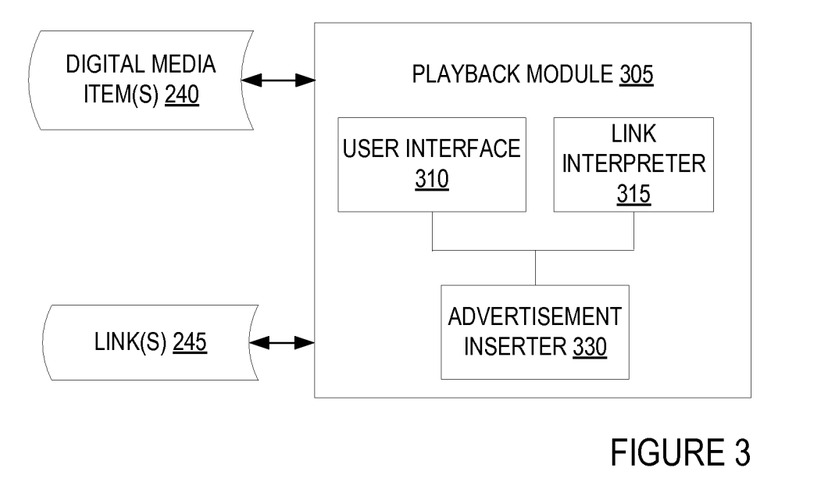
FIG. 3 is a block diagram of a playback module, in accordance with one embodiment of the present disclosure.

FIG. 3 is a block diagram of a playback module 305, in accordance with one embodiment of the present disclosure. The playback module 305 includes a link interpreter 315 and a user interface 310. Note that in alternative embodiments, the functionality the user interface 310 and/or link interpreter 315 may be combined into a single module or divided into multiple modules. Additionally, the functionality of the sharing module 205 and the functionality of the playback module 305 may be combined. For example, the sharing module 205 may be a sub-module of the playback module 305. In one embodiment, playback module 305 corresponds to playback module 124 of FIG. 1.

When an entity that is connected to a network (e.g., the Internet) accesses a digital media item, a web server that hosts the digital media item may launch playback module 305. The entity may access the digital media item from a web site hosted by the web server. Alternatively, the entity may select or access a link 245 (e.g., click on the link) in an application that can interpret a URL from the link (e.g., a browser), and that application may contact the web server that hosts playback module 305. Playback module 305 may transmit code 248 such as JavaScript code to the application. The JavaScript code may be for a media player. The application may execute the JavaScript code to invoke a media player that can play or otherwise present the digital media item. Note that playback module 205 may also be invoked in response to an entity interacting with embed code associated with the digital media item.

In one embodiment, link interpreter 315 parses information received in response to an entity accessing the link 245 (or embed code) to determine whether the link 245 (or embed code) includes any commands. For example, link interpreter 315 may interpret the language "t=1m21s" at the end of the link to mean begin playback 1 minute and 21 seconds into the digital media item. The link (or embed code) may additionally include instructions to play in high definition, for example. Playback module 305 streams or downloads the digital media item to the client. The media player executing on the client may then play or otherwise present the digital media item. Note that if a user wishes to view a portion of the digital media item that occurs before the specified start time, that user may scroll back to any play time before the specified time.

In one embodiment, playback module 305 includes an advertisement inserter 330. Advertisement inserter 330 may insert advertisements into the digital media item. The advertisements may be managed by playback module 305 or may be managed by third party web sites. Advertisement inserter 330 may also append advertisements to a front and/or back of the digital media item, or may otherwise cause an advertisement to be played before and/or after the digital media item is played. In one embodiment, advertisement inserter 330 uses the specified start time of a digital media item as input for determining what advertisements to use in association with the digital media item and/or for determining where in the digital media item to insert advertisements. For example, advertisement inserter 330 may present an advertisement to an entity regardless of what start time is specified. Alternatively, advertisement inserter 330 may not present the advertisement if the start time is greater than a start time threshold. In another example, advertisement inserter 330 may determine where to insert advertisements based on time offsets from the start time.

Figure 4A:
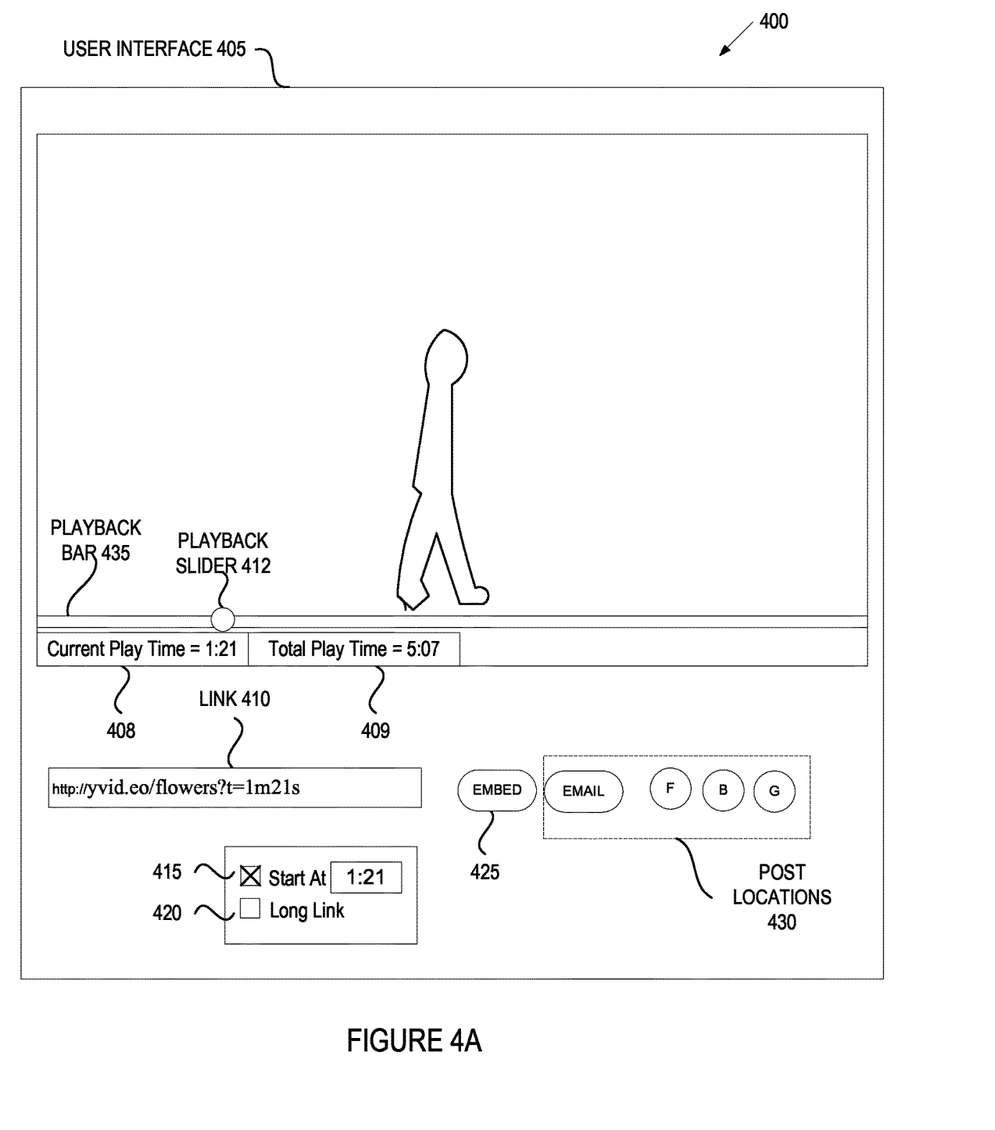
FIGS. 4A-4B illustrate a user interface for sharing a video, in accordance with one embodiment of the present disclosure.
Figure 4B:
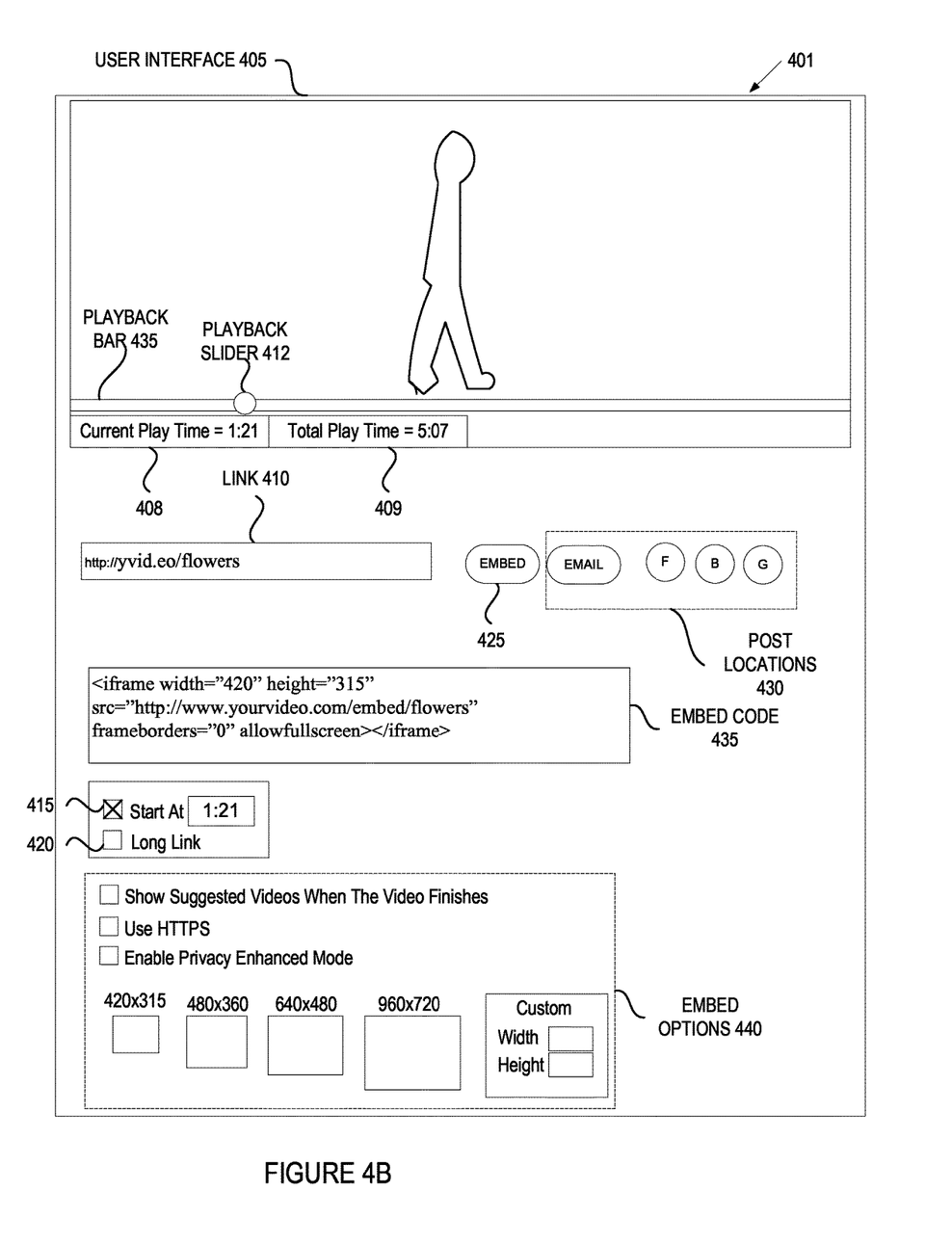

FIGS. 4A-4B illustrate embodiments of a user interface 405 for sharing a video. The user interface 405 may include a video player and one or more functions executing on a client machine. These functions and/or player may communicate with a playback module and/or sharing module executing on a server machine to enable the server machine to perform operations based on input from the entity. Alternatively, the functions and/or video player may perform the operations locally on a client machine based on the input from the entity. As shown, user interface 405 may show a current play time 408 and total play time 409 for the video. A playback slider 412 is positioned on a region of a playback bar 435 that corresponds to the current play time 408. The playback slider 412 may be adjusted (e.g., dragged) to any other region of the playback bar 435 to adjust the current play time 408.

FIG. 4A illustrates a first view 400 of the user interface 405, in accordance with one embodiment of the present disclosure. In the first view 400, a link is shown having a universal resource locator (URL) that points to a currently played digital media item. First view 400 further shows a "Start at" option 415. If the Start at option 415 is selected (as shown), then information is added to the link 410 to indicate that a digital media item played based on an entity accessing the link should play from a specified play time. As shown, the language "t=1m21s" is added to an end of the link 410 to specify the start time for the digital media item. The current start time (corresponding to the current play time 408) is additionally shown in the Start at option 415. As the video plays, the current play time 408 advances, which also causes the start time specified in the link 410 to advance and the time indicated in the start at option 415 to advance. Accordingly, an entity may watch the video to identify a desired start time for the video, and then generate a link that will cause the video to start from that start time. In one embodiment, a player executing on a client machine communicates with a sharing module and/or playback module running on a server machine to synchronize a current play time of a digital media item to a start time inserted into the link 410.

View 400 also shows a long link option 420. If the long link option is selected, then a long form URL link is generated. If the long link option 420 is not selected, then a short form URL link is generated.

The user interface 405 further includes multiple post locations 430. An entity may select any of the post locations to cause the link or embed code to be posted to the selected location. Examples of post locations include email, social network sites, blog web sites, forums, etc. The user interface 405 further includes an embed option 425, which is described with reference to FIG. 4B.

FIG. 4B illustrates a second view 401 of the user interface corresponding to the embed option 425 having been chosen, in accordance with one embodiment of the present disclosure. In second view 401, embed code 435 and one or more embed options 440 are shown. The embed code, when executed, causes a client machine to download JavaScript and execute a player within a web page to which the embed code was posted. Thus, an entity will not be redirected to a web site of a server machine that hosts a digital media item.

The embed options may include multiple player dimensions options that control a number of horizontal and vertical pixels to be used, such as 420×315, 480×360, 640×480 and 900×720. Embed options 440 may also include an option for an entity to select a custom width and height for a digital media item to be played. The selected width and height are then represented in the embed code 435. For example, a size of 420×315 is selected in the embed options 440, and the embed code includes instruction iframe width="420" height="315" to reflect these options. Other embed options include options to show suggested videos (or other digital media items) when a current digital media item is finished, to use HTTPS, and to enable a privacy-enhanced mode. Other options may also be used. Once the embed options 440 are selected, an entity may select one or more post locations 430 to post the embed code.

Figure 5:
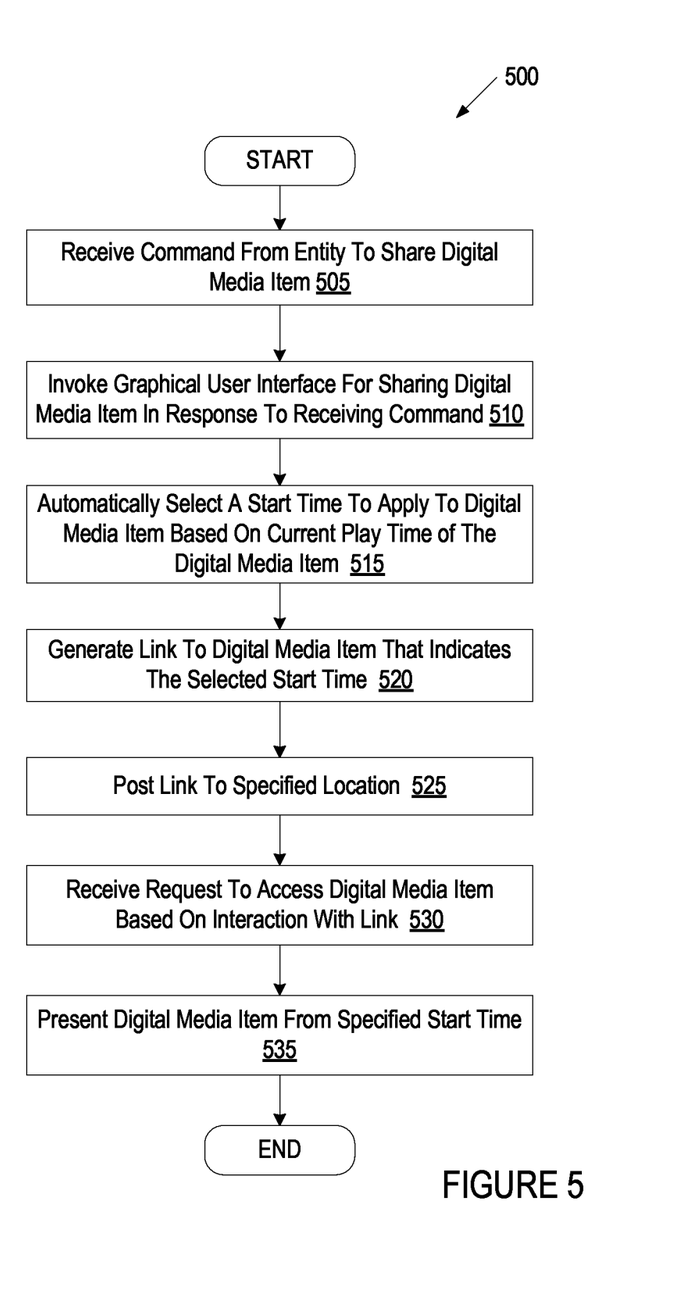
FIG. 5 is a flow diagram illustrating one embodiment for a method of sharing a digital media item from a specified start time.
Figure 6:
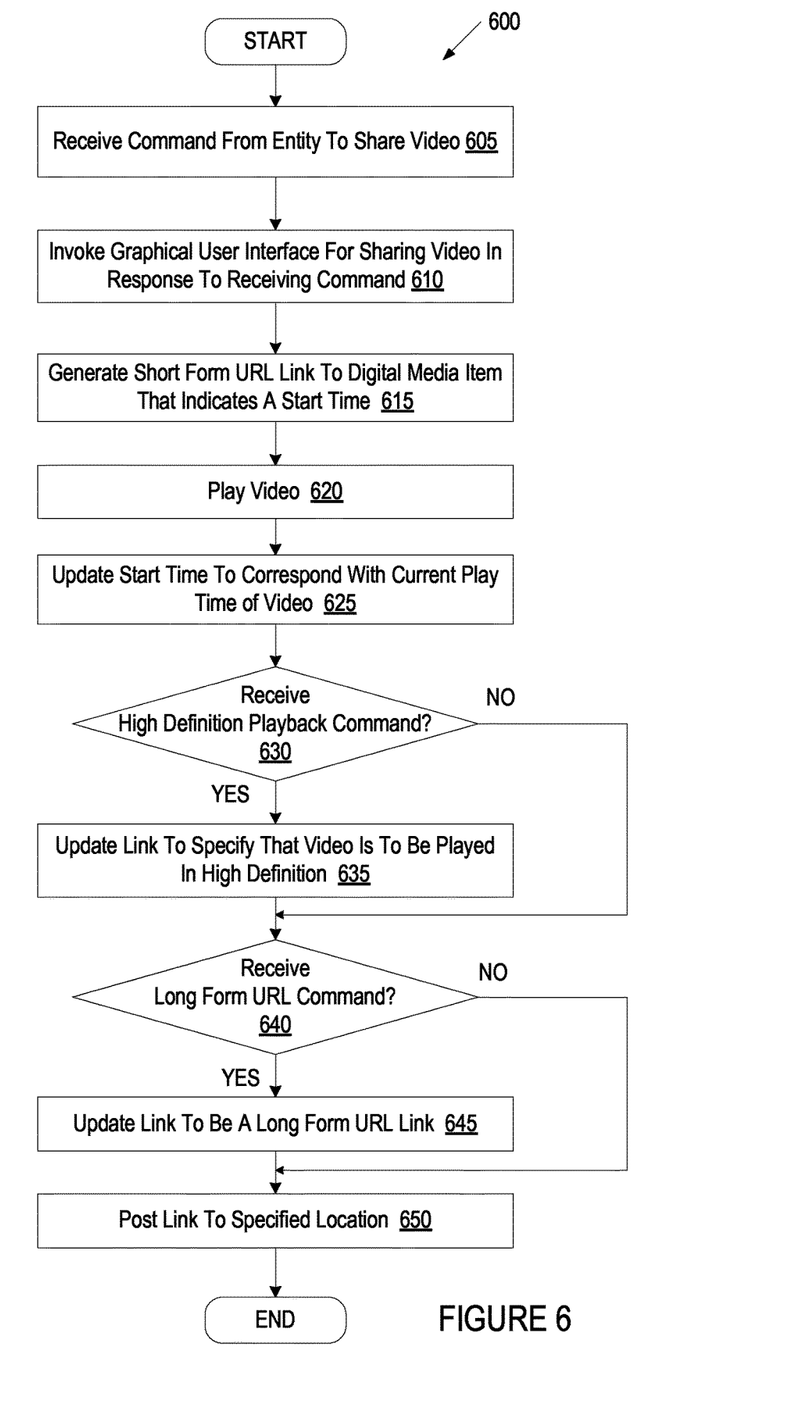
FIG. 6 is a flow diagram illustrating another embodiment for a method of sharing a digital media item from a specified start time.

FIGS. 5-6 are flow diagrams of various embodiments of methods for sharing digital media items from specified start times. The methods are performed by processing logic that may comprise hardware (circuitry, dedicated logic, etc.), software (such as is run on a general purpose computer system or a dedicated machine), or a combination of both. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one embodiment, the methods are performed by the server machine 115 of FIG. 1. The methods may be performed by sharing module 122 and/or playback module 124 running on server machine 115 or another machine. In another embodiment, the methods are performed by a client machine (e.g., a browser of a client machine). The methods may be performed by a sharing module 132 running on a client 102A-102N of FIG. 1. Alternatively, the methods may be performed by a combination of a server machine and a client machine. For example, the operations of the methods may be divided between a client and server machine.

FIG. 5 is a flow diagram illustrating one embodiment for a method 500 of sharing a digital media item from a specified start time. In one embodiment, the digital media item is a video. Alternatively, the digital media item may be an audio file. At block 505 of method 500, processing logic receives a command from an entity to share a digital media item. The digital media item may have been uploaded by the entity requesting to share the digital media item, or may have been previously uploaded by another entity. The digital media item may be stored by a media hosting service such as a video hosting website.

At block 510, processing logic invokes an interface for sharing the media item in response to receiving the command. In one embodiment, the interface for sharing the digital media item is invoked if the entity selects a "share" function provided by the processing logic. In one embodiment, the interface corresponds to user interface 405 of FIG. 4A and/or FIG. 4B.

At block 515, processing logic automatically selects a start time to apply to the digital media item based on a current play time of the digital media item. The current play time may be based on input received from an entity. The entity may, for example, type in the current play time or drag a play time slider to a position on a play time bar. The entity may also watch or listen to the digital media item, and the current play time (and thus specified start time) may advance as the digital media item plays. The entity may then pause the digital media item, and the current pay time for the digital media item may be used as the specified start time.

At block 520, processing logic generates a link or embed code to the digital media item. The link or embed code indicates the specified start time (e.g., at an end of the link). The link may be a long form URL hyperlink or a short form URL hyperlink. At block 525, processing logic posts the link or embed code to a specified location or locations. The specified location may be a web site, a forum, an email, an instant message, etc.

At block 530, processing logic receives a request to access the digital media item. The request may be received in response to an entity interacting with the link or embed code. When an entity accesses the link from a location to which it was posted, that entity will be redirected to a website of the digital media item's host, which will play or otherwise present the digital media item. Embed code may include code for presenting the digital media item directly from a location to which the embed code is posted. In such an embodiment, when an entity accesses the embed code from a location to which it was posted, that location may retrieve the digital media item from the digital media item's host, and then present the digital media item to the entity. Thus, the entity may view the digital media item without leaving the location to which the embed code was posted. At block 535, processing logic presents the digital media item from the specified start time. The entity viewing (or listening to) the digital media item may then fast forward, rewind, etc. the digital media item. For example, the entity may rewind the digital media item to a play time that is before the specified start time.

FIG. 6 is a flow diagram illustrating one embodiment for a method 600 of sharing a video from a specified start time. At block 605 of method 600, processing logic receives a command from an entity to share a video. The command may have been received based on the entity selecting a share option from a user interface of a video player. The video may have been uploaded by the entity or may have been previously uploaded by another entity. At block 610, processing logic invokes an interface for sharing the video in response to receiving the command. The interface may be invoked on a client, on a server, or both. The interface may be a sharing window or menu of the video player that includes a collection of sharing options. Other operations of the video player may continue to be available while the sharing window (or dropdown menu) is shown. For example, the video player may play the video, stop the video, rewind the video, fast forward the video, and so forth while the sharing window is shown.

At block 615, processing logic generates a short form URL link to the digital media item that indicates a start time of the video. At block 620, processing logic plays the video. At block 625, processing logic updates the start time in the link to correspond to a current play time of the video. Accordingly, the link may change in correspondence to changes in a current play time of the video.

At block 630, processing logic determines whether a high definition playback command has been received via the user interface. If a high definition playback command has been received, then the method continues to block 635, and processing logic updates the link to specify that the video is to be played in high definition. When the video is presented to an entity in response to the entity accessing the link, the presentation will be in high definition regardless of preference settings of the entity. If no high definition playback command has been received, the method proceeds to block 640.

At block 640, processing logic determines whether a long form URL command has been received. If a long form URL command is received, the method continues to block 645, and processing logic updates the link to be a long form URL link. Otherwise, the method proceeds to block 650. At block 650, processing logic posts the link to a specified location (or locations). Alternatively, or in addition, processing logic may provide the link to an entity. The entity may then copy the link and paste it to a web page, email, etc.

Figure 7:
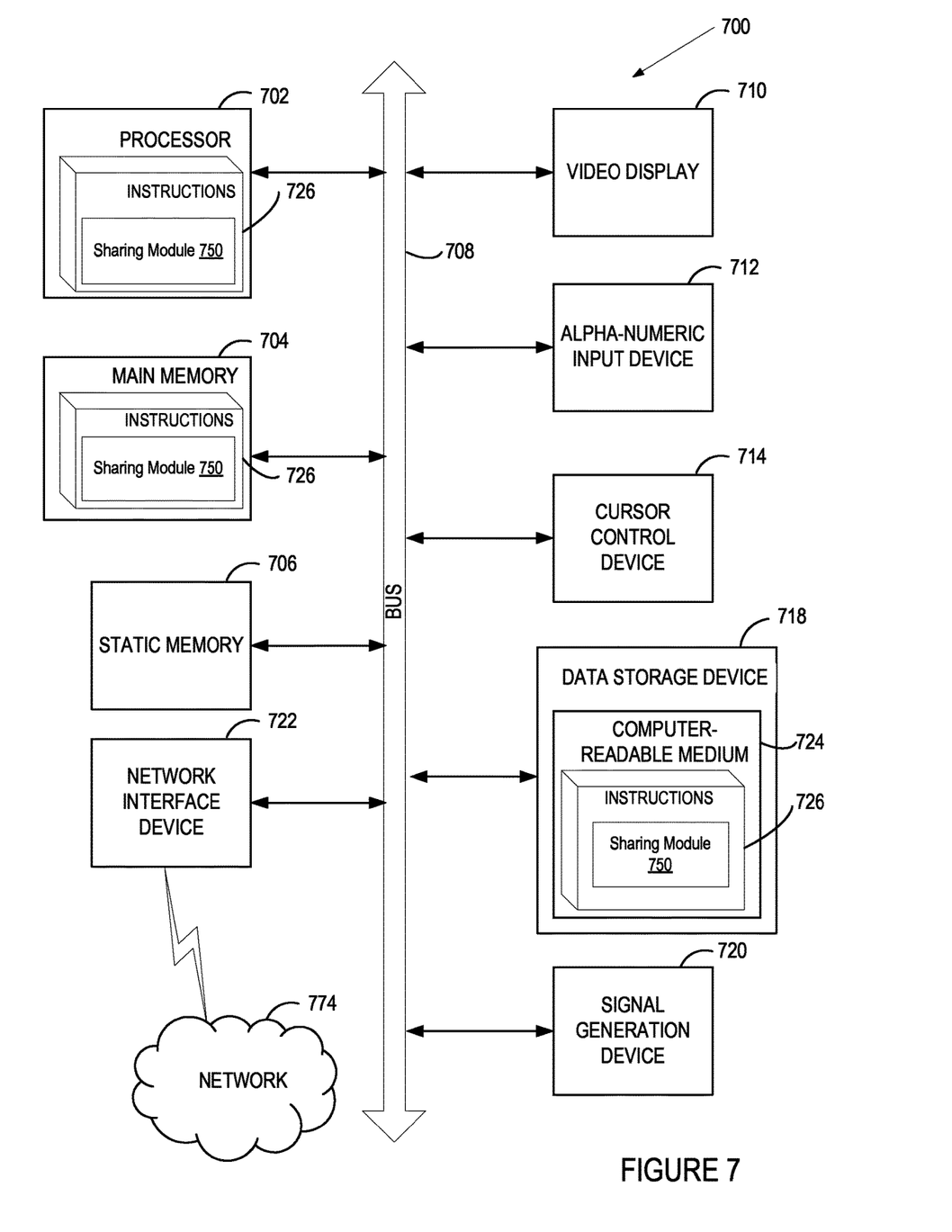
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one embodiment, the instructions 726 include instructions for a sharing module 750, which may correspond to sharing module 205 of FIG. 2, and/or a software library containing methods that call a sharing module. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:
    receiving, by a computing device providing access to digital media items, a command from an entity to share a digital media item presented by a media player;
    invoking, by the computing device, a graphical user interface for sharing the digital media item in response to receiving the command from the entity to share the digital media item with one or more users, wherein the graphical user interface comprises the media player presenting the digital media item, a current play time of the digital media item, and one or more options for sharing the digital media item;
    detecting, by the computing device, a change in the current playtime of the digital media item in the graphical user interface for sharing the digital media item, wherein the change in the current play time occurs automatically as the media player continues playing the digital media item;
    in response to detecting the change in the current playtime of the digital media item in the graphical user interface for sharing the digital media item, the change in the current play time occurring automatically as the media player continues playing the digital media item:
        automatically selecting the changed current play time of the digital media item as a start time for beginning a playback of the digital media item for the one or more users with whom the digital media item is to be shared; and
        causing a presentation, in the graphical user interface, of the start time for beginning the playback of the digital media item for the one or more users with whom the digital media item is to be shared; and
    causing a link or embed code to the digital media item to be presented in the graphical user interface concurrently with the presentation of the start time for beginning the playback of the digital media item for the one or more users with whom the digital media item is to be shared, wherein accessing the link or embed code by one of the one or more users causes the digital media item to be presented to the one of the one or more users from the start time.

2. The method of claim 1, wherein the digital media item is a video and the media player is a video player.

3. The method of claim 2, further comprising:
    receiving a command from the entity to play the video in high definition, wherein accessing the link or embed code causes the video to be presented in high definition regardless of specified settings of a system on which the video is played.

4. The method of claim 1, further comprising:
    in response to receiving a command to use a long form universal resource locator (URL) for the link, generating the long form URL; and
    if no command to use the long form URL is received, defaulting to use of a short form URL.

5. The method of claim 1, further comprising:
    providing the link or embed code to a third party system specified by the entity, the link or embed code comprising the start time for beginning the playback of the digital media item for the one or more users with whom the digital media item is to be shared.

6. The method of claim 1, wherein identifying the change in the current play time comprises:
    presenting, in the graphical user interface, a slider at a position associated with a currently played portion of the digital media item, and the current play time of the digital media item; and
    detecting at least one of a change in the position of the slider or a change in the current play time.

7. A non-transitory computer readable storage medium having instructions that, when executed by a processing device, cause the processing device to perform a method comprising:
    receiving, by a computing device providing access to digital media items, a command from an entity to share a digital media item presented by a media player;
    invoking, by the computing device, a graphical user interface for sharing the digital media item in response to receiving the command from the entity to share the digital media item with one or more users, wherein the graphical user interface comprises the media player presenting the digital media item, a current play time of the digital media item, and one or more options for sharing the digital media item;
    detecting a change in the current playtime of the digital media item in the graphical user interface for sharing the digital media item, wherein the change in the current play time occurs automatically as the media player continues playing the digital media item;
    in response to detecting the change in the current playtime of the digital media item in the graphical user interface for sharing the digital media item, the change in the current play time occurring automatically as the media player continues playing the digital media item:
        automatically selecting the changed current play time of the digital media item as a start time for beginning a playback of the digital media item for the one or more users with whom the digital media item is to be shared, and
        causing a presentation, in the graphical user interface, of the start time for beginning the playback of the digital media item for the one or more users with whom the digital media item is to be shared; and
    causing a link or embed code to the digital media item to be presented in the graphical user interface concurrently with the presentation of the start time for beginning the playback of the digital media item for the one or more users with whom the digital media item is to be shared, wherein accessing the link or embed code by one of the one or more users causes the digital media item to be presented to the one of the one or more users from the start time.

8. The non-transitory computer readable storage medium of claim 7, wherein the digital media item is a video and the media player is a video player.

9. The non-transitory computer readable storage medium of claim 8, the method further comprising:
    receiving a command from the entity to play the video in high definition, wherein accessing the link or embed code causes the video to be presented in high definition regardless of specified settings of a system on which the video is played.

10. The non-transitory computer readable storage medium of claim 7, the method further comprising:
   in response to receiving a command to use a long form universal resource locator (URL) for the link, generating the long form URL; and
   if no command to use the long form URL is received, defaulting to use of a short form URL.

11. The computer readable storage medium of claim 7, the method further comprising:
   providing the link or embed code to a third party system specified by the entity, the link or embed code comprising the start time for beginning the playback of the digital media item for the one or more users with whom the digital media item is to be shared.

12. The computer readable storage medium of claim 7, wherein identifying the change in the current play time comprises:
   presenting, in the graphical user interface, a slider at a position associated with a currently played portion of the digital media item, and the current play time of the digital media item; and
   detecting at least one of a change in the position of the slider or a change in the current play time.

13. An apparatus comprising:
   a memory to store instructions for sharing digital media items; and
   a processing device, coupled to the memory, wherein the processing device is configured to:
      receive a command from an entity to share a digital media item presented by a media player;
      invoke a graphical user interface for sharing the digital media item in response to receiving the command from the entity to share the digital media item with one or more users, wherein the graphical user interface comprises the media player presenting the digital media item, a current play time of the digital media item, and one or more options for sharing the digital media item;
      detect a change in the current play time of the digital media item in the graphical user interface for sharing the digital media item, wherein the change in the current play time occurs automatically as the media player continues playing the digital media item;
      in response to detecting the change in the current playtime of the digital media item in the graphical user interface for sharing the digital media item, the change in the current play time occurring automatically as the media player continues playing the digital media item:
         automatically select the changed current play time of the digital media item as a start time for beginning a playback of the digital media item for the one or more users with whom the digital media item is to be shared, and
         cause a presentation, in the graphical user interface, of the start time for beginning the playback of the digital media item for the one or more users with whom the digital media item is to be shared; and
      cause a link or embed code to the digital media item to be presented in the graphical user interface concurrently with the presentation of the start time for beginning the playback of the digital media item for the one or more users with whom the digital media item is to be shared, wherein accessing the link or embed code by one of the one or more users causes the digital media item to be presented to the one of the one or more users from the start time.

14. The apparatus of claim 13, wherein the digital media item is a video and the media player is a video player.

15. The apparatus of claim 14, wherein the processing device is further configured to:
   receive a command from the entity to play the video in high definition, wherein accessing the link or embed code causes the video to be presented in high definition regardless of specified settings of a system on which the video is played.

16. The apparatus of claim 13, wherein the processing device is further configured to:
   generate a long form universal resource locator (URL) in response to receiving a command to use the URL for the link; and
   if no command to use the long form URL is received, default to use of a short form URL.

17. The apparatus of claim 13, wherein the processing device is further configured to:
   present, in the graphical user interface, a slider at a position associated with a currently played portion of the digital media item, and the current play time of the digital media item; and
   detect at least one of a change in the position of the slider or a change in the current play time.

* * * * *

UNITED STATES PATENT AND TRADEMARK OFFICE
CERTIFICATE OF CORRECTION

PATENT NO. : 9,733,794 B1
APPLICATION NO. : 13/424679
DATED : August 15, 2017
INVENTOR(S) : Taylor Eric Hughes, Jennifer Bilotta and Brian Glick Page 1 of 1

It is certified that error appears in the above-identified patent and that said Letters Patent is hereby corrected as shown below:

In the Claims

In Claim 11, Column 15, Line 11, insert --non-transitory-- before "computer".

In Claim 12, Column 15, Line 18, insert --non-transitory-- before "computer".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*